United States Patent
Kanayama

(10) Patent No.: US 7,970,113 B2
(45) Date of Patent: Jun. 28, 2011

(54) CALLER NUMBER NOTIFICATION

(75) Inventor: Kazuo Kanayama, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 1225 days.

(21) Appl. No.: 11/612,856

(22) Filed: Dec. 19, 2006

(65) Prior Publication Data

US 2007/0165807 A1    Jul. 19, 2007

(30) Foreign Application Priority Data

Dec. 26, 2005 (JP) ................................. 2005-372102

(51) Int. Cl.
  H04M 1/56 (2006.01)
  H04M 15/06 (2006.01)
(52) U.S. Cl. ............................. 379/142.04; 379/142.01
(58) Field of Classification Search ................. 379/142, 379/234, 387.02, 413.01, 142.01, 142.04, 379/231
  See application file for complete search history.

(56) References Cited

U.S. PATENT DOCUMENTS

| | | | | |
|---|---|---|---|---|
| 5,963,627 A | * | 10/1999 | Mano et al. | 379/142.01 |
| 6,590,977 B1 | * | 7/2003 | Taguchi | 379/413.01 |
| 6,707,909 B1 | * | 3/2004 | Inoue | 379/387.02 |

FOREIGN PATENT DOCUMENTS

| | | |
|---|---|---|
| JP | 63-33047 A | 2/1988 |
| JP | 7-203006 A | 8/1995 |
| JP | 10-13547 A | 1/1998 |
| JP | 11-32357 A | 2/1999 |
| JP | 11-41359 A | 2/1999 |
| JP | 2000-124990 A | 4/2000 |
| JP | 2000-184406 A | 6/2000 |
| JP | 2001-358851 A | 12/2001 |
| JP | 2003-524318 A | 8/2003 |

* cited by examiner

Primary Examiner — Ahmad F Matar
Assistant Examiner — Sonia Gay
(74) Attorney, Agent, or Firm — Sughrue Mion, PLLC

(57) ABSTRACT

A caller number notification synchronized with an incoming signal is disclosed. An analog circuit interface section outputs incoming call signal presence information that shows whether to receive the incoming call signal that has the information indicated at a predetermined position on a highway and outputs the received caller ID to a speech signal path. An analog extension interface section detects the incoming call signal presence information on the highway, detects the caller ID on the speech signal path, generates an incoming call signal based on the detected incoming signal presence information and sends out the generated incoming call signal and the detected caller ID to the analog extension. A system control section connects the analog circuit interface section to the analog extension interface section.

4 Claims, 3 Drawing Sheets

CALLER NUMBER NOTIFICATION

BACKGROUND OF THE INVENTION

1. Field of the Invention

The present invention relates to a private branch exchange system and a caller number notification method using the same, and in particular, to a private branch exchange system for notifying an extension telephone set in a private branch of information transmitted from a public network to a private branch exchange system and a caller number notification method using the same.

2. Description of the Related Art

Hitherto, a service has been provided that allows a receiver's telephone set to display the telephone number of a caller's telephone set. The service enables the telephone number of a caller's telephone set to be displayed on the receiver's telephone set by providing analyzing means which analyzes the telephone number information of a caller's telephone set that is received in an exchange and is transmitted to the receiver's telephone set by the exchange and then is received by the receiver's telephone set and display means which displays the analyzed telephone number.

However, a private branch exchange that is installed at a private branch in a workplace does not have a function for notifying the number of a caller, that is transmitted from a public network, to the extension telephone set of a receiver. For this reason, a caller's number cannot be displayed on the extension telephone set.

JP-1999-041359A discloses a method in which a dedicated modem for notifying a private branch exchange of a caller's number and a database for storing caller's numbers are provided to notify an extension telephone set of a caller's number stored in the database.

However, the method disclosed in the above patent document requires storing caller's numbers in a device of the private branch exchange. Using a large scale device controlled by a plurality of control blocks causes a problem in which an incoming call signal transmitted to an extension telephone set cannot be synchronized with the stored caller's numbers during transmission timing.

SUMMARY OF THE INVENTION

The purpose of the present invention is to provide a private branch exchange system capable of notifying a caller's number synchronized with an incoming call signal irrespective of the size of a device and the caller number notification method using the same.

In the present invention, an analog circuit interface section which is connected to an analog circuit of a public network and which receives an incoming signal, a caller ID that shows the caller's number and a speech signal from the analog circuit outputs an incoming call signal presence information showing whether to receive the incoming call signal with the information indicated at a predetermined position on a highway. The received caller ID is output onto a speech signal path connected by system control means. The analog extension interface section which is connected to the analog extension of a private branch and which sends out the incoming call signal, the caller ID and the speech signal to the analog extension detects the incoming call signal presence information on the highway and detects the caller ID on the speech signal path. An incoming call signal is generated based on the detected incoming call signal presence information and the generated incoming call signal and the detected caller ID are sent out to the analog extension.

The incoming signal is neither written into nor read from memory and therefore there is no significant delay which would otherwise by caused by the writing and reading process. The caller ID flows through the speech signal path so that it is not stored in the system and therefore no significant delay is caused, which otherwise would have occurred by storing it in the system. For this reason, the incoming call signal and the caller ID that are received from the analog circuit are transmitted to the analog extension at the same timing that the incoming call signal is received from the analog circuit.

The above and other objects, features, and advantages of the present invention will become apparent from the following description with reference to the accompanying drawings which illustrate an example of the present invention.

DETAILED DESCRIPTION OF THE PREFERRED EMBODIMENTS

Figure 1:
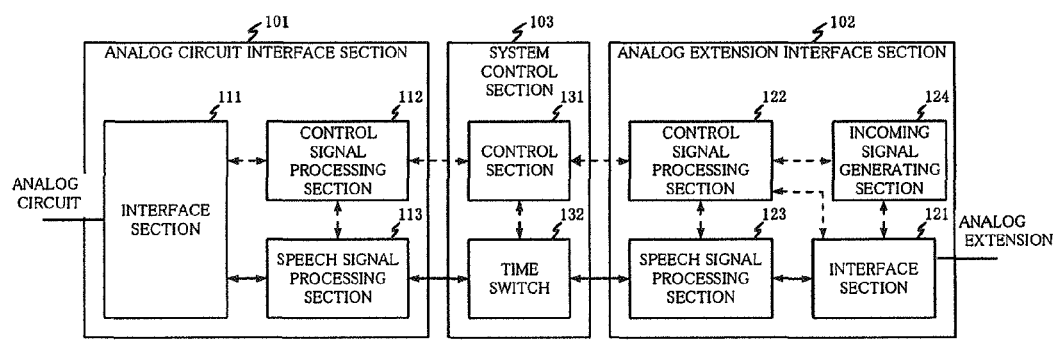
FIG. 1 shows one embodiment of a private branch exchange system of the present invention.

Referring to FIG. 1, illustrated therein is an embodiment of a private branch exchange system composed of analog circuit interface section 101, analog extension interface section 102 and system control section 103. Analog circuit interface section 101 is connected to an analog circuit of a public network, has an interface function with a public network in the private branch exchange system and performs transmission and reception of analog signals between the private branch exchange system and the public network. Analog extension interface section 102 is connected to the analog extension provided at a private branch in a work place and in other places, has an interface function with extension telephones in the private branch exchange system and performs transmission and reception of signals between the private branch exchange system and the extension telephones connected to the analog extension. System control section 103 is connected between analog circuit interface section 101 and analog extension interface section 102 to control the entire private branch exchange system.

In addition, analog circuit interface section 101 includes interface section 111, control signal processing section 112 and speech signal processing section 113. Interface section 111 is connected to the analog circuit of a public network, has an interface function with the public network in the private branch exchange system, and transmits and receives analog signals of the public network. Control signal processing section 112 processes control signals such as incoming call signals from among the signals received by interface section 111. Speech signal processing section 113 encodes the speech signals from among the signals received by interface section 111 into Pulse Code Modulation (PCM) signals.

Analog extension interface section 102 includes interface section 121, control signal processing section 122, speech signal processing section 123 and incoming call signal generating section 124. Interface section 121 is connected to the analog extension provided at a private branch in a work place and in other places, has an interface function with extension telephones in the private branch exchange system and performs transmission and reception of signals between the private branch exchange system and extension telephones connected to the analog extension. Control signal processing section 122 processes control signals such as incoming call signals from among signals to be transmitted from interface section 121 to the analog extension. Speech signal processing section 123 transforms the speech signals, encoded into PCM signal from among signals transmitted from interface section 121 to the analog extension, into analog signals. Incoming call signal generating section 124 generates the incoming call signal that is to be transmitted to the analog extension.

In addition, system control section 103 includes control section 131 and time switch 132. Control section 131 controls analog circuit interface section 101, analog extension interface section 102 and system control section 103. Time switch 132 receives a speech signal output from speech signal processing section 113 and outputs a speech signal loaded on a time slot according to an instruction from control section 131 to control the route of the speech signal. Incidentally, control section 131 may be formed by combining a CPU, which is used, in general, to run programs, with a memory.

In the present embodiment, a highway in which signals pass from the analog circuit to the analog extension through interface section 111, speech signal processing section 113, time switch 132, speech signal processing section 123 and interface section 121 is provided with another channel (hereinafter referred to as "incoming information channel") in addition to a plurality of channels used by speech signals (hereinafter referred to as "speech channel"). Through the use of the incoming information channel, the information that indicates presence or absence of the incoming call signal is transmitted and received.

A private branch exchange system that is described here as an example is such that a caller ID is received during the time when an incoming call signal is received form the analog circuit. The caller ID refers to the telephone number of a caller's telephone set displayed on the receiver's telephone set by a caller number notification function provided by, for example, the number display service that has been widely used in recent years.

Figure 2:
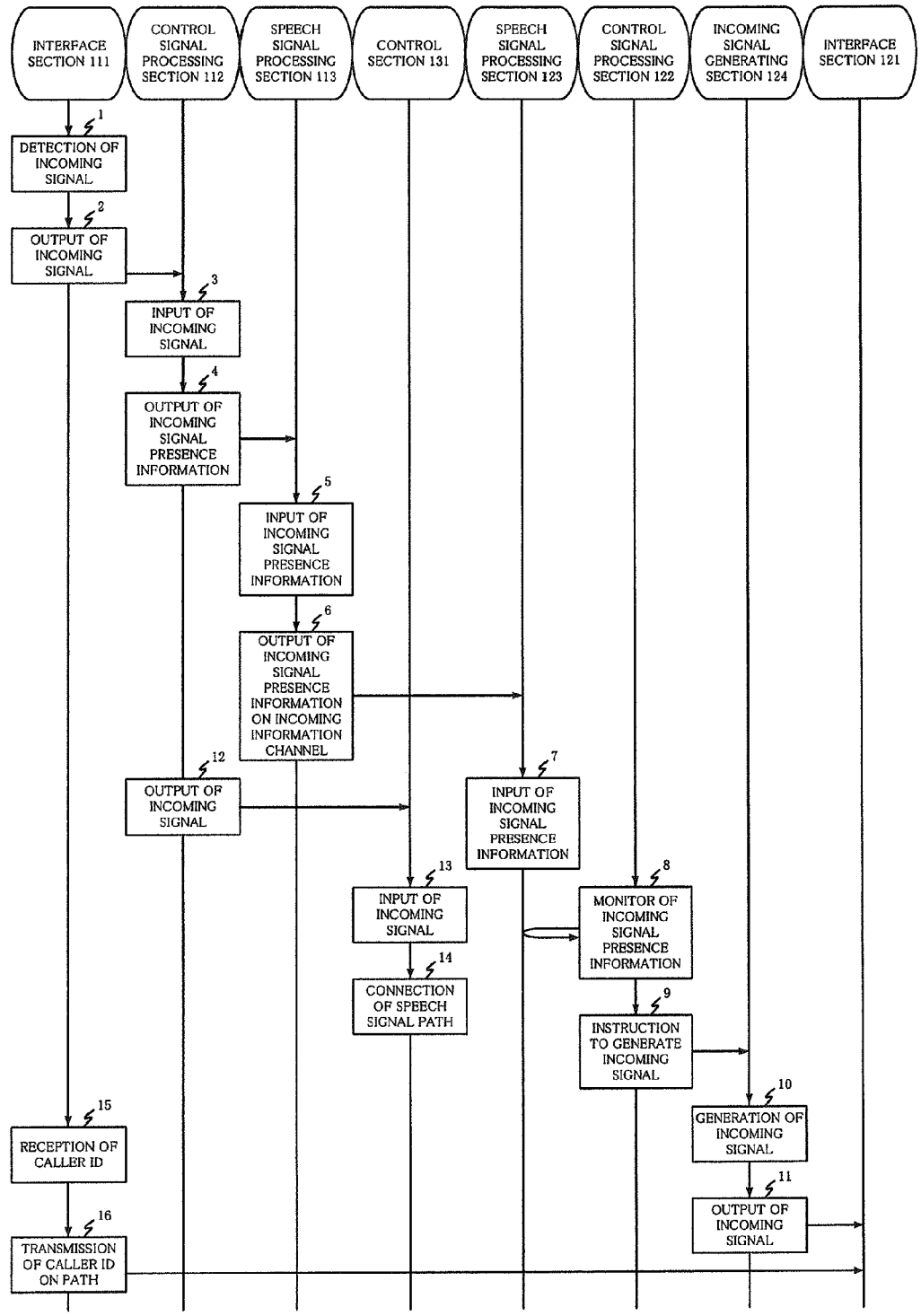
FIG. 2 shows a sequence chart for describing a caller number notification method for the private branch exchange system illustrated in FIG. 1.

In the following a caller number notification method in the private branch exchange system configured in the foregoing manner is described, with reference to FIG. 2.

First, if an incoming call from a public network to an extension telephone connected to a private branch exchange system has been received, interface section 111 detects the incoming call signal from the analog circuit at step 1. Then, the incoming call signal detected by interface section 111 is output to control signal processing section 112 at step 2.

If the incoming call signal output from interface section 111 is input to control signal processing section 112 at step 3, control signal processing section 112 outputs incoming call signal presence information that notifies speech signal processing section 113 of the arrival of the incoming call signal at step 4. Then, the incoming call signal presence information output from control signal processing section 112 is input to speech signal processing section 113 at step 5.

The incoming call signal presence information normally indicates "0". If an incoming call signal is received, "1" is indicated, and if an incoming call signal is not received, "0" is indicated as it is.

At this point, control signal processing section 112 sets "1" on a time slot, that corresponds to the incoming call signal on the incoming information channel at speech signal processing section 113, at step 6 to output it to time switch 132. It is to be understood that the incoming call signal needs to be associated in advance with the position of the time slot that corresponds to the incoming call signal.

Figure 3:
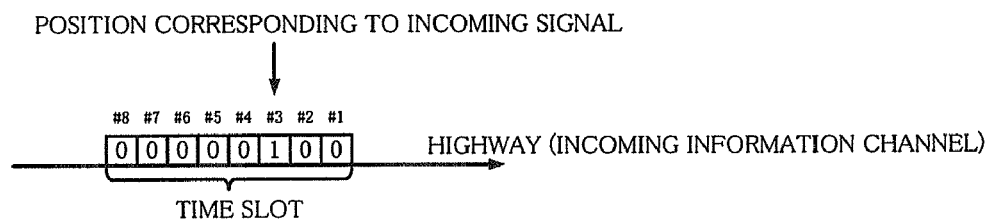
FIG. 3 shows only a time slot of an incoming information channel from among data flowing into a highway.

Referring to FIG. 3, for data flowing into the incoming information channel among data flowing into the highway, the positions that correspond to the incoming call signals are allocated to a plurality of time slots. If an incoming call signal is received, "1" is set on the time slot that corresponds to the incoming call signal.

In this case, eight time slots that correspond to the incoming call signal are allocated. Since the incoming call signal that corresponds to the third time slot has been received, "1" is set on the third time slot.

Wherever a signal on the incoming information channel exists in the time slot, time switch 132 outputs the signal to all destinations as in the case of a broadcast. Thus, incoming call signal presence information input into time switch 132 is output to speech signal processing section 123 that is connected to all the destinations of time switch 132 because the destinations are controlled so that they do not need to wait until a route control is completed from control section 131 to time switch 132.

The incoming call signal presence information output from time switch 132 is input to speech signal processing section 123 at step 7.

On the other hand, control signal processing section 122 monitors whether incoming call signal presence information is input to speech signal processing section 123 at step 8.

It is acceptable to adopt a monitor method in which a predetermined period is set on control signal processing section 122 to cause control signal processing section 122 to periodically monitor speech signal processing section 123 within the set period. It is also acceptable to adopt another monitor method in which incoming call signal presence information is input to speech signal processing section 123, after which speech signal processing section 123 notifies control signal processing section 122 of the reception of the incoming call signal presence information and control signal processing section 122 detects the notification.

If control signal processing section 122 detects that incoming call signal presence information has been input to speech signal processing section 123, control signal processing section 122 instructs incoming call signal generating section 124 at step 9 to generate an incoming call signal that corresponds to the time slot on which the detected incoming signal presence information has been set. Incoming call signal generating section 124 generates the incoming call signal at step 10, and the generated incoming call signal is output from incoming signal generating section 124 to interface section 121 at step 11.

In addition, the incoming call signal is output from control signal processing section 112 to control section 131 at step 12 at the same time that the incoming call signal presence information is output from control signal processing section 112 at step 4. The incoming call signal output from control signal processing section 112 is input to control section 131 at step 13.

A speech signal flows through time switch 132 based on the input incoming call signal to create a path, and control section 131 connects a speech signal path at step 14.

On the other hand, if the incoming call signal is detected at step 1, a caller ID is received by the interface section 111 during the interval when an incoming call signal is received at step 15. After that, the caller ID that has been received is transmitted from interface section 111 to the speech signal path that has been connected by using a speech signal channel at step 14. The caller ID that is transmitted on the speech signal path is output to interface section 121 through speech signal processing section 113, time switch 132 and speech signal processing section 123 at step 16.

The incoming call signal output from incoming call signal generating section 124 at step 11 and the caller ID transmitted onto the speech signal path are synchronized with each other and transmitted from interface section 121 to the analog extension.

As stated above, the incoming call signal is sent to interface section 121 without being processed by control section 131, so that the incoming call signal neither needs to be written into nor read from memory that is provided on control section 131. Thus there is no significant delay which would otherwise be caused through the process in which signals are written into or read from memory. The caller ID flows through the speech signal path, so that it will not be stored in the system. No significant delay occurs which would otherwise be caused by storing the caller ID in the system. For this reason, the incoming call signal that is received from the analog circuit and the caller ID are transmitted to the analog extension at the same timing that the incoming call signal is received from the analog circuit.

While a preferred embodiment of the present invention has been described in specific terms, such description is for illustrative purpose only, and it is to be understood that changes and variations may be made without departing from the spirit or scope of the following claims.

What is claimed is:

1. A private branch exchange system comprising:
an analog circuit interface section which is connected to an analog circuit of a public network, receives an incoming call signal, a caller ID showing a caller's number and a speech signal from the analog circuit, outputs incoming call signal presence information that shows whether to receive the incoming call signal that has information indicated at a predetermined position on a highway and outputs the caller ID to a speech signal path which is a route through which the speech signal passes;
an analog extension interface section which is connected to an analog extension of a private branch, sends out the incoming call signal, the caller ID and the speech signal to the analog extension, detects the incoming call signal presence information on the highway, detects the caller ID on the speech signal path, generates an incoming call signal based on the detected incoming signal presence information and sends out the generated incoming call signal and the detected caller ID to the analog extension; and
a system control section which is connected between the analog circuit interface section and the analog extension interface section to connect the speech signal path.

2. The private branch exchange system according to claim 1, wherein the analog circuit interface section indicates incoming call signal presence information by one bit on a dedicated channel provided on the highway.

3. A method for a private branch exchange system having an analog circuit interface section which is connected to an analog circuit of a public network and which receives an incoming call signal, a caller ID showing a caller's number and a speech signal from the analog circuit, an analog extension interface section which is connected to an analog extension of a private branch and which sends out the incoming signal, the caller ID and the speech signal to the analog extension, and a system control section which is connected between the analog circuit interface section and the analog extension interface section to connect the speech signal path which is a route through which the speech signal passes, the method comprising the steps of:
the analog circuit interface section indicating incoming call signal presence information showing whether to receive the incoming call signal at a predetermined position on a highway;
the analog circuit interface section outputting the caller ID onto the speech signal path;
the analog extension interface section detecting the incoming call signal presence information on the highway;
the analog extension interface section detecting the caller ID in the speech signal path;
the analog extension interface section generating an incoming call signal based on the detected incoming signal presence information; and
sending out the generated incoming call signal and the detected caller ID from the analog extension interface section to the analog extension.

4. The method according to claim 3 comprising the step of indicating the incoming signal presence information by one bit on a dedicated channel provided on the highway.

* * * * *